United States Patent
Shi et al.

(10) Patent No.: US 12,103,664 B2
(45) Date of Patent: Oct. 1, 2024

(54) ARRANGEMENT FOR INFLUENCING LIQUID FLOW AND A METHOD

(71) Applicant: BAE SYSTEMS plc, London (GB)

(72) Inventors: Weichao Shi, Glasgow (GB); Mehmet Atlar, Glasgow (GB); Callum Stark, Glasgow (GB); Moritz Troll, Glasgow (GB); Matthew Thompson, Barrow-in-Furness (GB); Leon Malcolm Sweet, Barrow-in-Furness (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/006,471

(22) PCT Filed: Jul. 19, 2021

(86) PCT No.: PCT/GB2021/051844
§ 371 (c)(1),
(2) Date: Jan. 23, 2023

(87) PCT Pub. No.: WO2022/019416
PCT Pub. Date: Jan. 27, 2022

(65) Prior Publication Data
US 2023/0264807 A1    Aug. 24, 2023

(30) Foreign Application Priority Data

Jul. 23, 2020 (EP) ..................................... 20275125
Jul. 23, 2020 (GB) ..................................... 2011399

(51) Int. Cl.
*B64C 23/06*      (2006.01)
*B63H 1/18*      (2006.01)
(Continued)

(52) U.S. Cl.
CPC ............... *B64C 23/06* (2013.01); *B63H 1/18* (2013.01); *B64C 21/02* (2013.01); *B64C 21/08* (2013.01);
(Continued)

(58) Field of Classification Search
None
See application file for complete search history.

(56) References Cited

U.S. PATENT DOCUMENTS

RE16,001 E * 2/1925 Gill .......................... B63H 1/16
416/189
3,295,608 A    1/1967 Arshall
(Continued)

FOREIGN PATENT DOCUMENTS

DE      19634296 A1    4/1997
EP      1896323 A1    3/2008
(Continued)

OTHER PUBLICATIONS

International Search Report and Written Opinion received for PCT/GB2021/051844. Mailed: Sep. 29, 2021. 15 pages.
(Continued)

*Primary Examiner* — Juan G Flores
(74) *Attorney, Agent, or Firm* — Finch & Maloney PLLC (57) ABSTRACT

An arrangement for influencing a liquid flow includes a first section selectively configurable to provide a vortex generator surface, the vortex generator surface comprising a series of laterally aligned projections, to induce vortices in the liquid flow.

9 Claims, 5 Drawing Sheets

(51) Int. Cl.
B64C 21/02 (2006.01)
B64C 21/08 (2023.01)
F15D 1/00 (2006.01)
F15D 1/06 (2006.01)

(52) U.S. Cl.
CPC .............. *F15D 1/009* (2013.01); *F15D 1/06* (2013.01); *B64C 2230/04* (2013.01)

(56) References Cited

U.S. PATENT DOCUMENTS

| | | | |
|---|---|---|---|
| 3,921,391 | A | 11/1975 | Hall et al. |
| 4,177,637 | A | 12/1979 | Pask |
| 4,825,795 | A | 5/1989 | Slemmons |
| 6,986,689 | B2 | 1/2006 | Norman |
| 9,429,071 | B2 * | 8/2016 | Quackenbush ........... F02C 7/04 |
| 2003/0213227 | A1 | 11/2003 | Balzer |
| 2005/0245146 | A1 * | 11/2005 | Norman ................. B63H 20/00 440/76 |
| 2011/0037268 | A1 | 2/2011 | Sammy |
| 2012/0325325 | A1 * | 12/2012 | Quackenbush ........... F02C 7/04 137/15.1 |
| 2016/0052621 | A1 | 2/2016 | Ireland et al. |
| 2023/0272810 | A1 | 8/2023 | Shi et al. |
| 2023/0296119 | A1 | 9/2023 | Thompson et al. |

FOREIGN PATENT DOCUMENTS

| | | |
|---|---|---|
| JP | S60121192 A | 6/1985 |
| WO | 02/064422 A1 | 8/2002 |
| WO | 2018/139234 A1 | 8/2018 |
| WO | 2022/018415 A1 | 1/2022 |
| WO | 2022/018416 A1 | 1/2022 |
| WO | 2022018414 A1 | 1/2022 |

OTHER PUBLICATIONS

GB Search Report under Section 17(5) received for GB Application No. 2011399.9, dated Apr. 14, 2021. 3 pages.
Extended European Search Report received for EP Application No. 20275125.1, dated Jan. 18, 2021. 10 pages.
International Search Report and Written Opinion received for PCT/GB2021/051842, mailed: Sep. 28, 2021. 14 pages.
GB Search Report under Section 17(5) received for GB Application No. 2011396.5, dated Apr. 14, 2021. 3 pages.
Extended European Search Report received for EP Application No. 20275123.6, dated Jan. 18, 2021. 22 pages.
International Search Report and Written Opinion received for PCT/GB2021/051843. Mailed: Sep. 29, 2021. 29 pages.
Extended European Search Report received for EP Application No. 20275124.4, dated Jan. 18, 2021. 9 pages.

* cited by examiner

ARRANGEMENT FOR INFLUENCING LIQUID FLOW AND A METHOD

The present disclosure relates to arrangements and duct arrangements for influencing fluid flow, or specifically liquid flow, and associated crafts and methods.

BACKGROUND

Aircraft and watercraft comprise components which are exposed to, or make use of, fluid flows. Certain components are configured to interact with, including guide, the fluid flows to facilitate the production of thrust or lift. Increasing or maintaining the magnitude of thrust or lift produced, whilst using an equivalent or lower quantity of fuel, is important in reducing carbon emissions. Thus, techniques for improving fluid interaction with craft components are of interest in the field.

The interaction of craft components with fluid flows results in a region of disturbed flow (often turbulent) downstream of the craft, known as a wake. Often, craft must maintain a safe distance so as not to be disturbed by the wake. Techniques for reducing or otherwise influencing the wake are of interest in the field.

The interaction of craft components with fluid flows results in noise. Techniques for reducing or otherwise influencing the noise are of interest in the field, for example to reduce disturbance to aquatic life in the field of watercraft, or to reduce environmental noise in the field of aircraft.

It is an object of the present invention to provide an improved and/or method thereof and/or address one or more of the problems discussed above, or discussed elsewhere, or to at least provide an alternative system and/or method.

SUMMARY OF THE INVENTION

According to the present invention there is provided arrangements and methods as set forth in the appended claims. Other features of the invention will be apparent from the dependent claims, and the description which follows.

According to a first aspect of the present invention there is provided a duct arrangement for influencing fluid flow, the duct arrangement comprising: a first duct section arranged to receive a fluid flow therethrough, the first duct section defining a first direction through the first duct section from a fluid inlet end to a fluid outlet end; a second duct section defining a second direction through the second duct section from a fluid inlet end to a fluid outlet end, the second duct section comprising a vortex generator surface, wherein the vortex generator surface is arranged to induce vortices in the fluid flow through the first duct section.

Duct sections are advantageous in guiding fluid flows and housing components. The provision of a vortex generator surface is beneficial in reducing and/or minimising the magnitude of a wake induced by the duct sections. The vortex generator surface also improves the properties of the fluid flow, such that interaction with, for example, a subsequent rotor results in improved rotor efficiency and/or thrust production. In one example, the vortex generator surface may be configured to interact with a fluid flow to induce vortices such that the properties of fluid flow comprises a vorticity magnitude. In one example, the duct sections interact with the fluid flow to induce a first set of fluid properties, and the vortex generator surface interacts with the fluid flow to induce a second set of fluid properties. The second set of fluid properties may comprise an increase in vorticity magnitude of the fluid flow. Surprisingly and advantageously, in this way, the vorticity magnitude of the wake is reduced.

A duct section may be a hollow cylinder, tube or ring. A duct section may be a section, or region, of a larger duct, cylinder, tube or ring. The duct cross-section may be of any shape, for example square or rectangular, but is typically arcuate, for example circular or elliptical.

In one example, the vortex generator surface is configured to induce a plurality of spaced apart vortices. The spatial separation of the vortices may correspond to the form of the vortex generator surface. The plurality of vortices may be periodic. In one example, the vortex generator surface comprises a series of projections. In one example, the projections are serrations and/or undulations. In one example, the projections may comprise a length and a height. The length may extend between the sides of the projection. The series of projections may be aligned substantially side by side. That is, the projections may be laterally aligned. The projections may be only laterally aligned, for example extending only in one dimension or direction (e.g. along a line, edge or curve), and not forming an array extending in or distributed across a 2D surface. The projections may be curved along their length. In one example, the spatial separation of the vortices may be proportional to the spatial separation of the projections. In one example, each projection is configured to induce a vortex in the fluid flow.

The projections may project in a direction substantially opposite to the first direction. That is, the height may be parallel to the first direction, and the projections may comprise a base and a tip, the direction from the base to the tip being substantially opposite to the first direction. The bases of the projections may be laterally aligned. The series of projections may form an at least partially continuous wave-like profile. That is, a wave may be formed, which may be curved or sawtooth or chevron like. The projections may be adjacent to one another, such that there is no gap between the projections. It has been found that an at least partially continuous wave-like profile of laterally aligned projections is a highly advantageous configuration of projections for inducing vortices in the fluid flow.

In one example, the vortex generator surface is a ring, or otherwise has a similar cross-sectional profile to the duct sections. In this way, a vortex generator surface can be provided that has a similar cross-sectional profile to the duct sections. This is advantageous for inducing vortices in the fluid flow through the first duct section.

In one example, the second duct section is attached to, supported by and/or is formed integrally with, the first duct section. The second duct section and the first duct section may be one single integrally formed unit. Alternatively, the second duct section and first duct section may be separate parts configured to be assembled to form a single unit.

In this way, the second duct section may be attached to an existing first duct section, for example by a retrofit process. In this way, a vortex generator surface can be provided on an existing first duct section. Alternatively, the first and second duct sections can be provided as an integrally formed unit. The vortex generator surface can thereby be located at an optimal position for interacting with the fluid flow. Furthermore, this construction results in a robust duct arrangement.

In one example, the second duct section is aligned with and/or is coaxial with the first duct section.

Advantageously, in this way, the second duct section, and thus the vortex generator surface, is well positioned to interact and influence the fluid flow to induce vortices in the fluid flow through the first duct section.

In one example, the duct arrangement further comprises a rotor housed in the first duct section.

Rotors can be used to generate power and/or propulsion. The duct arrangement including a rotor improves the rotor efficiency and also leads to a reduction in the magnitude of the wake produced by the rotor. In one example, the rotor is a propeller and/or turbine rotor.

In one example, the second duct section is provided upstream of the first duct section along the first direction.

In this way, the first duct section and second duct section are separated along the first direction. The vortices induced by the vortex generator surface thereby pass downstream to the first duct section. This is advantageous in reducing the wake induced by the duct sections. This is also advantageous in reducing the wake induced by any components housed in the duct section, such as a rotor, and also improving rotor efficiency.

In one example, the second duct section is provided at a leading edge of the first duct section. In one example, the vortex generator surface is provided at a leading edge of the first duct section.

In this way, improved interaction with the fluid flow is facilitated. Moreover, in this way, vortices of an advantageous orientation are thereby induced. Furthermore, the vortex generator surface may interact with the fluid flow prior to any surfaces downstream. The vortices induced by the vortex generator surface can subsequently pass downstream, where the vortices present in the fluid flow can advantageously interact with downstream components to improve their efficiency and/or reduce the magnitude of the wake.

In one example, the second duct section is provided upstream of the rotor along the first direction.

Advantageously, the vortices induced in the fluid flow are incident on the rotor and interact with the wake produced by the rotor. It has been found that this has the effect of improving the level of thrust or propulsion produced by the rotor. Additionally, this also results in an advantageous reduction in the magnitude of the wake structure trailing the craft.

In one example, the projections of the vortex generator surface project in a direction substantially opposite to the first direction.

In this way, improved interaction with the fluid flow is facilitated. Moreover, in this way, vortices of an advantageous orientation are thereby induced.

In one example, the first duct section interacts with the fluid flow to induce a first set of fluid properties, and the vortex generator surface interacts with the fluid flow to induce a second set of fluid properties, the second set of fluid properties comprising an increase in the vorticity magnitude of the fluid flow. Surprisingly and advantageously, this facilitates a reduction in the vorticity magnitude of the wake.

In one example, the vortex generator surface is configured to induce a plurality of spatially separated vortices in the fluid flow, optionally periodic vortices. Spatially separated vortices are beneficial in reducing vorticity magnitude of the wake and also in reducing drag.

According to a second aspect of the present invention there is provided an aircraft or watercraft comprising a duct arrangement according to the first aspect of the present invention.

Aircraft includes aeroplanes, helicopters, unmanned aerial vehicles, or other machines capable of flight. Watercrafts include boats, ships and hovercraft, unmanned water-based vehicles, including those capable of underwater operation. Watercrafts also include floating platforms, such as oil rigs, with propulsion or energy generating capabilities by virtue of rotors.

According to a third aspect of the present invention there is provided a method of influencing fluid flow, the method comprising: generating vortices in a fluid flow using a second duct section comprising a vortex generating surface; and receiving the fluid flow in a first duct section.

According to a fourth aspect of the present invention there is provided an arrangement for influencing liquid flow (as opposed to air flow), the arrangement comprising: a first section selectively configurable to provide a vortex generator surface to induce vortices in the liquid flow.

Such an arrangement is highly advantageous in improving the efficiency of watercraft propulsion systems, and additionally in reducing the magnitude of the wake created by watercraft. Selective configuration of the vortex generator surface allows said surface to be provided only when necessary or desired, or to a necessary or desired extent or degree.

In one example, the arrangement further comprises: a second section, wherein the first section and second section are movable relative to one another to provide the vortex generator surface.

In this way, the vortex generator surface need not always be provided, or may be movable to a specific location for increased or decreased interaction with the fluid flow. This is beneficial in inducing vortices in the liquid flow only when necessary or desired, or to a necessary or desired extent or degree.

In one example, the vortex generator surface may be configured to interact with a liquid flow to induce vortices such that the properties of liquid flow comprises a vorticity magnitude. In one example, other surfaces of the arrangement interact with the liquid flow to induce a first set of liquid properties, and the vortex generator surface, when provided, interacts with the liquid flow to induce a second set of liquid properties. The second set of liquid properties may comprise an increase in vorticity magnitude of the liquid flow. Surprisingly and advantageously, in this way, the vorticity magnitude of the wake is reduced.

In one example, the first section is movable away from and/or toward the second section, for example, wherein the first section is extendable from and/or retractable into the second section. That is, the arrangement may be a telescopic or sleeve-like arrangement.

In this way, the profile of the arrangement when the vortex generator surface is not provided may be minimised.

In one example, the first section is selectively configurable to provide the vortex generator surface at a leading edge of the second section.

In this way, the vortex generator surface may interact with the liquid flow prior to any surfaces downstream. The vortices induced by the vortex generator surface can subsequently pass downstream, where the vortices present in the liquid flow can advantageously interact with downstream components to improve their efficiency and/or reduce the magnitude of the wake.

In one example, the second section comprises a flow control surface, for example a fin, rudder, duct and/or rotor, and/or is a flow control surface.

Flow control surfaces in watercraft generate wake, and inducing vortices which interact with the flow control surfaces can advantageously result in a reduction in magnitude of the resulting wake. In one example, flow control surfaces interact with the liquid flow to induce a first set of liquid properties, and the vortex generator surface, when provided, interacts with the liquid flow to induce a second set of liquid properties. The second set of liquid properties may comprise an increase in vorticity magnitude of the liquid flow. Surprisingly and advantageously, in this way, the vorticity magnitude of the wake is reduced.

In one example, the arrangement further comprises a controller arranged to implement the selective configuration of the vortex generator surface.

Providing a controller facilitates an automated arrangement, and or an arrangement which is configurable based on variables monitored by the controller.

In one example, the controller is arranged to implement the selective configuration of the vortex generator surface in dependence upon: a user command, input from a sensor arrangement (local to or remote from the arrangement) and/or one or more environmental conditions.

Selective configuration of the vortex generator surface may thereby be implemented only when necessary or desired, and based on appropriate feedback or control.

Alternatively, selective configuration of the vortex generator surface may be somewhat passive, for example moving to a particular configuration when liquid properties force this change (e.g. with appropriate liquid pressure, temperature, salinity, flow rate, and so on).

In one example, the first section is selectively configurable to change the shape of the arrangement, thereby to provide the vortex generator surface to induce vortices in the liquid flow. In one example, the first section is selectively configurable to change the shape of the vortex generator surface. In one example, the first section is selectively configurable to change the shape of the vortex generator surface, thereby to provide the vortex generator surface to induce vortices in the liquid flow.

Advantageously, a first shape of the arrangement, without the vortex generator surface provided, may be optimised for a certain operational characteristic, whereas a second shape of the arrangement, with the vortex generator surface provided, may be optimised for propulsion efficiency and/or wake reduction. Additionally, altering the shape of the vortex generator surface is advantageous for improving the propulsion efficiency to a certain degree, or reducing the wake magnitude by a required or desired amount.

In one example, the first section is selectively configurable in: a first configuration wherein the vortex generator surface is provided to induce vortices with a first property in the liquid flow; and a second configuration wherein the vortex generator surface is provided to induce vortices with a second property in the liquid flow.

In one example, the second property is greater than the first property, for example, wherein the first property is a magnitude of zero and the second property is a non-zero magnitude, or wherein the first property is a non-zero magnitude and the second property is a greater non-zero magnitude.

In one example, the first section is selectively configurable to provide a vortex generator surface comprising a series of projections. In one example, the projections are serrations and/or undulations. In one example, the projections may comprise a length and a height. The length may extend between the sides of the projection. The series of projections may be aligned substantially side by side. That is, the projections may be laterally aligned. The projections may be curved along their length.

In one example, the first section is selectively configurable to provide a vortex generator surface to induce a plurality of spatially separated vortices in the fluid flow, optionally periodic vortices. Spatially separated vortices are beneficial in reducing vorticity magnitude of the wake and also in reducing drag.

According to a fifth aspect of the present invention there is provided a watercraft comprising an arrangement according to the fourth aspect of the present invention.

Watercrafts include boats, ships and hovercraft, unmanned water-based vehicles, including those capable of underwater operation. Watercrafts also include floating platforms, such as oil rigs, with propulsion or energy generating capabilities by virtue of rotors According to a sixth aspect of the present invention there is provided a method of influencing liquid flow in an arrangement comprising a first section selectively configurable to provide a vortex generator surface, the method comprising: configuring the first section to provide the vortex generator surface to induce vortices in the liquid flow.

According to a seventh aspect of the present invention there is provided an arrangement for influencing fluid flow, the arrangement comprising: a first section selectively configurable to provide a vortex generator surface, the vortex generator surface comprising a series of laterally aligned projections, to induce vortices in the fluid flow.

Laterally aligned projections are a highly advantageous construction for inducing vortices in a fluid flow. Selective configuration of the first section to provide a vortex generator surface enables the vortex generator surface to be provided only when necessary or desired.

Laterally aligned may be alternatively defined or described as the projections extending only in one dimension or direction (e.g. along a line, edge or curve), and not forming an array extending in or distributed across a 2D surface. Again, this arrangement may be advantageous in certain applications, for example in terms of inducing vortices in a liquid flow.

In one example, the vortex generator surface may be configured to interact with a fluid flow to induce vortices such that the properties of fluid flow comprises a vorticity magnitude. In one example, the first section interacts with the fluid flow to induce a first set of fluid properties, and the vortex generator surface, when provided, interacts with the fluid flow to induce a second set of fluid properties. The second set of fluid properties may comprise an increase in vorticity magnitude of the fluid flow. Surprisingly and advantageously, in this way, the vorticity magnitude of the wake is reduced.

In one example, the projections are serrations and/or undulations. In one example, the projections may comprise a length and a height. The length may extend between the sides of the projection. Laterally aligned may mean that the series of projections are aligned substantially side by side. The projections may be curved along their length.

The projections may comprise a base and a tip. The bases of the projections may be laterally aligned. The series of projections may form an at least partially continuous wave-like profile. That is, a wave may be formed, which may be curved or sawtooth or chevron like. The projections may be adjacent to one another, such that there is no gap between the projections. It has been found that an at least partially continuous wave-like profile of laterally aligned projections is a highly advantageous configuration of projections for inducing vortices in the fluid flow.

In one example, the arrangement further comprises: a second section, wherein the first section and second section are movable relative to one another to provide the vortex generator surface.

In this way, the vortex generator surface need not always be provided, or may be movable to a specific location for increased or decreased interaction with the fluid flow. This is beneficial in inducing vortices in the liquid flow only when necessary or desired.

In one example, the first section is movable away from and/or toward the second section, for example, wherein the first section is extendable from and/or retractable into the second section.

In this way, the profile of the arrangement when the vortex generator surface is not provided may be minimised.

In one example, the first section is selectively configurable to provide the vortex generator surface at a leading edge of the second section.

In this way, improved interaction with the fluid flow is facilitated. Moreover, in this way, vortices of an advantageous orientation are thereby induced. Furthermore, the vortex generator surface may interact with the fluid flow prior to any surfaces downstream. The vortices induced by the vortex generator surface can subsequently pass downstream, where the vortices present in the fluid flow can advantageously interact with downstream components to improve their efficiency and/or reduce the magnitude of the wake.

In one example, the second section comprises a flow control surface, for example a fin, rudder, duct and/or rotor, and/or is a flow control surface.

Flow control surfaces in an aircraft and watercraft generate wake. Inducing vortices which interact with the flow control surfaces can advantageously result in a reduction in magnitude of the resulting wake.

In one example, the arrangement further comprises a controller arranged to implement the selective configuration of the vortex generator surface.

Providing a controller facilitates an automated arrangement, and or an arrangement which is configurable based on variables monitored by the controller.

In one example, the controller is arranged to implement the selective configuration of the vortex generator surface in dependence upon: a user command, input from a sensor arrangement (local to or remote from the arrangement) and/or one or more environmental conditions.

Selective configuration of the vortex generator surface may thereby be implemented only when necessary or desired, and based on appropriate feedback or control.

Alternatively, selective configuration of the vortex generator surface may be somewhat passive, for example moving to a particular configuration when liquid properties force this change (e.g. with appropriate liquid pressure, temperature, salinity, flow rate, and so on)

In one example, the arrangement comprises an actuator assembly operable to provide the vortex generator surface. An actuator may be mechanical (e.g. a piston) or fluidic (using the movement of fluid, or using fluid pressure, to shape the surface).

The provision of actuators to provide the vortex generator surface ensures robust and reliable control of the vortex generator surface. Selective configuration of the vortex generator surface may thereby be implemented by control of the actuator assembly to provide the vortex generator surface only when necessary or desired.

In one example the first section comprises: a resilient membrane; the actuator assembly operable to adjust the profile of the resilient membrane to provide the vortex generator surface.

A resilient membrane has a smooth profile, which assists in reducing drag. Moreover, the profile of the resilient profile can be manipulated to provide a vortex generator surface of a particular shape which is advantageous to achieve a necessary or desired level of reduction in the magnitude of the wake and/or improvement in rotor efficiency.

In one example, the first section is formed from a shape memory alloy.

Shape memory alloys can repeatedly be reshaped to provide a vortex generator surface of a desired shape. In this case, an actuator assembly may not be necessary, increasing the reliability of provision of the vortex generator surface, and simplifying construction.

In one example, the first section is selectively configurable in: a first configuration wherein the vortex generator surface is provided to induce vortices with a first property in the fluid flow; and a second configuration wherein the vortex generator surface is provided to induce vortices with a second property in the fluid flow.

In one example, the second property is greater than the first property, for example, wherein the first property is a magnitude of zero and the second property is a non-zero magnitude, or wherein the first property is a non-zero magnitude and the second property is a greater non-zero magnitude.

In one example, the first section is selectively configurable to provide a vortex generator surface to induce a plurality of spatially separated vortices in the fluid flow, optionally periodic vortices. Spatially separated vortices are beneficial in reducing vorticity magnitude of the wake and also in reducing drag.

According to an eighth aspect of the present invention there is provided an aircraft or watercraft comprising an arrangement according to seventh aspect of the present invention.

Aircraft includes aeroplanes, helicopters, unmanned aerial vehicles, or other machines capable of flight. Watercrafts include boats, ships and hovercraft, unmanned water-based vehicles, including those capable of underwater operation. Watercrafts also include floating platforms, such as oil rigs, with propulsion or energy generating capabilities by virtue of rotors.

According to a ninth aspect of the present invention there is provided a method of influencing fluid flow in an arrangement comprising a first section selectively configurable to provide a vortex generator surface comprising a series of laterally aligned projections, the method comprising: configuring the first section to provide the vortex generator surface to induce vortices in the fluid flow.

Any aspect of the present invention described above may comprise any or all features of any or all other aspects of the present invention, as desired or as appropriate. This will be clear to the skilled person from their own knowledge, and the clearly closely linked nature of all aspects and embodiments discussed herein.

BRIEF DESCRIPTION OF THE DRAWINGS

For a better understanding of the invention, and to show how embodiments of the same may be carried into effect, reference will now be made, by way of example only, to the accompanying diagrammatic drawings in which.

DETAILED DESCRIPTION

Figure 1:
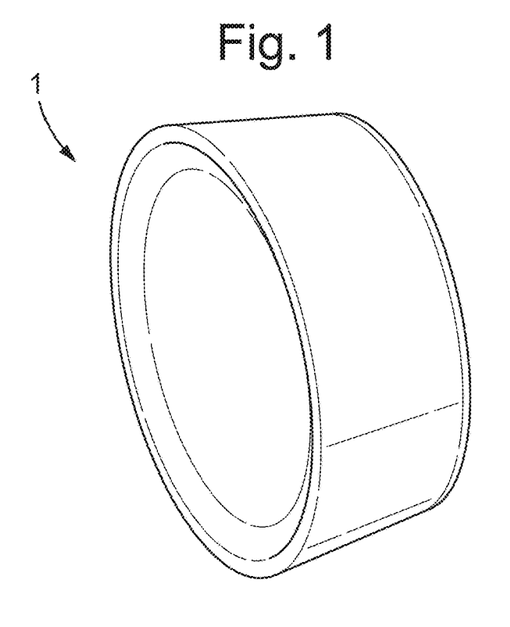
FIG. 1 shows a perspective view of a duct.

Referring to FIG. 1, a duct 1 is shown. The duct 1 is a hollow cylinder, tube, or ring. In this example, the duct 1 is for housing, or otherwise surrounding, a rotor. In one exemplary embodiment, the rotor is a propeller rotor. In another exemplary embodiment, the rotor is a turbine rotor.

Figure 2:
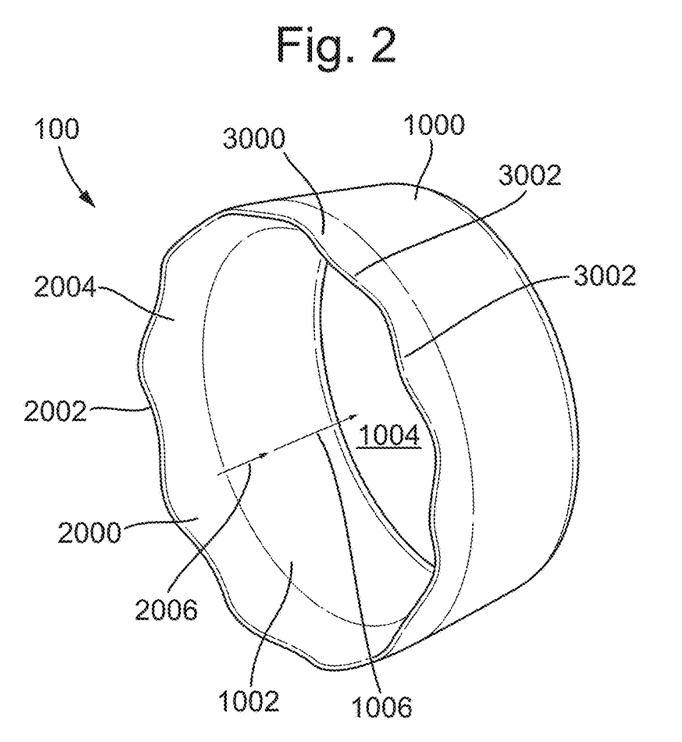
FIG. 2 shows a perspective view of a duct arrangement according to an exemplary embodiment.
Figure 3:
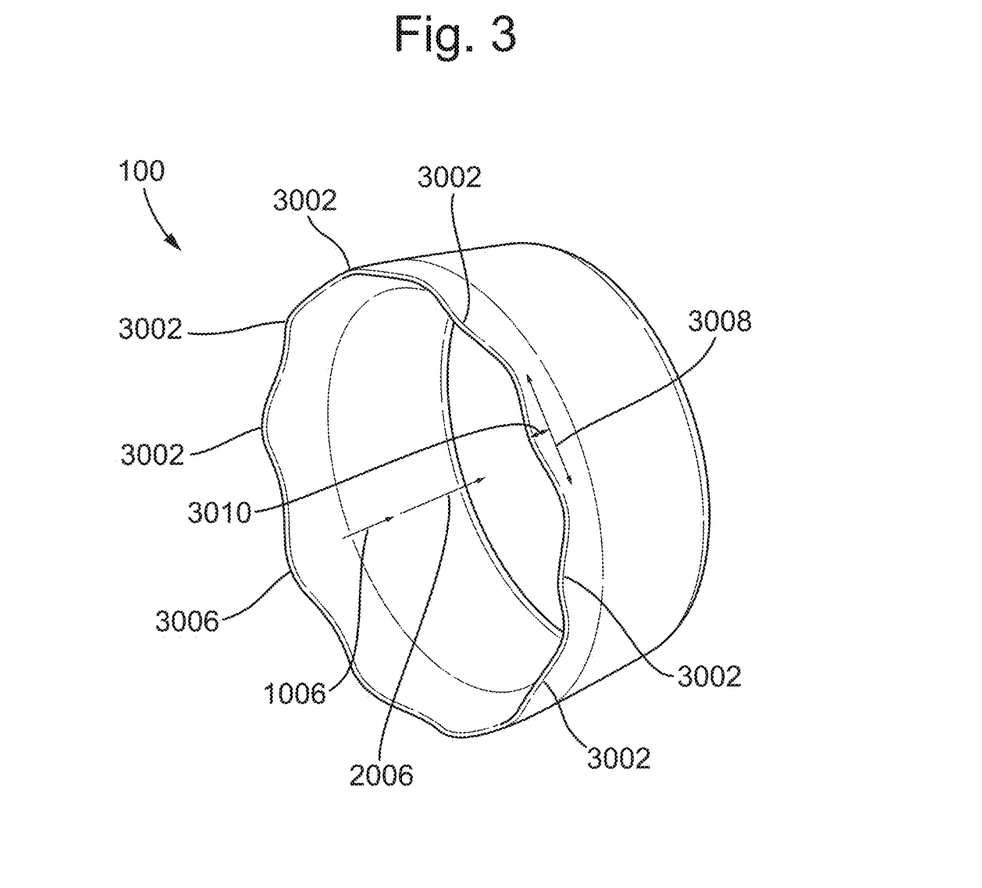
FIG. 3 shows an enlarged view of the duct arrangement of FIG. 2.

Referring to FIGS. 2 and 3, a duct arrangement 100 is shown. The duct arrangement 100 is for installation in an aircraft or watercraft. The duct arrangement comprises a first duct section 1000 which is of a similar or identical construction to duct 1. That is, the first duct section 1000 is a hollow cylinder, tube, or ring. The first duct section 1000 is for housing, or otherwise surrounding, a rotor.

The first duct section 1000 is arranged to receive a fluid flow therethrough. The first duct section 1000 comprises a fluid inlet end 1002 and a fluid outlet end 1004. The fluid inlet end 1002 is a frontward or leading end of the first duct section 1000. The fluid outlet end 1004 is a rearward or trailing end of the first duct section 1000. The first duct section 1000 defines a first direction (indicated by arrow 1006) through the first duct section 1000 from the fluid inlet end 1002 to the fluid outlet end 1004.

The duct arrangement 100 further comprises a second duct section 2000. The second duct section 2000 comprises a fluid inlet end 2002 and a fluid outlet end 2004. The fluid inlet end 2002 is a frontward, leading, end of the second duct section 2000. The fluid outlet end 2004 is a rearward, trailing, end of the second duct section 2000 and opens into the fluid inlet end 1002 of the first duct section 1000. The second duct section 2000 defines a second direction (indicated by arrow 2006) through the second duct section 2000 from the fluid inlet end 2002 to the fluid outlet end 2004. The second duct section 2000 is provided upstream of the first duct section 1000 along the first direction 1006. The second duct section 2000 is provided at the leading edge of the first duct section 1000. Where the first duct section 1000 houses a rotor, the second duct section 2000 is provided upstream of the rotor along the first direction 1006.

The first duct section 1000 and second duct section 2000 are radially and circumferentially aligned (e.g. the circumferences are substantially the same and are aligned) and are coaxial. In this manner, the first direction 1006 is substantially parallel to, and substantially aligned with, the second direction 2006.

In some embodiments, the first duct section 1000 and second duct section 2000 are separately formed. Each duct section is formed from a material well-suited to the application in question, and might typically be formed from a polymer, a metal, and so on. The first duct section 1000 and second duct section 2000 are bolted, adhered or otherwise fixed together and are thereby connected or attached. In this way, the second duct section 2000 is supported by the first duct section 1000. In one embodiment, the second duct section 2000 is provided in portions of duct section and each portion is bolted to the first duct section 1000 thereby to form the second duct section 2000. In another embodiment, the first duct section 1000 comprises a screw thread formed at a frontward end of the first duct section 1000 and the second duct section 2000 comprises a corresponding screw thread provided at a rearward end of the second duct section 2000. The corresponding screw threads are engageable to attach the first and second duct sections 1000, 2000. In other embodiments, the second duct section 2000 is formed integrally with the first duct section 1000. In this way, the second duct section 2000 is attached to the first duct section 1000 and is supported by the first duct section 1000.

For the avoidance of doubt, in some exemplary embodiments, a duct section may only be a region of a larger duct, tube or ring.

The second duct section 2000 comprises a vortex generator surface 3000. Vortex generators are known. Conventional vortex generators are aerodynamic devices, which typically comprise a fixed vane. Conventional vortex generators are attached to lifting surfaces of aircraft, or to turbine blades.

The vortex generator surface 3000 is arranged to induce vortices in the fluid flow through the first duct section 1000. The vortex generator surface 3000 comprises a plurality of projections 3002. The term "projections" is intended to include protrusions, serrations and/or undulations and so on. Each projection has a length 3008 in a lateral, circumferential direction (which may be described as a "wavelength" or portion of a wavelength) and a height 3010 in an axial direction (which may be described as an "amplitude"). The projections 3002 project in a direction substantially opposite to the first direction 1006.

In absence of a vortex generator surface 3000, the duct sections 1000, 2000 interact with the fluid flow to induce a first set of fluid properties. The provided vortex generator surface 3000 in the duct arrangement 100 interacts with the fluid flow to induce a second set of fluid properties, the second set of fluid properties comprising an increase in vorticity magnitude of the fluid flow. The vortex generator surface 3000 is configured to induce a plurality of periodic, spaced apart vortices, which correspond to the form of the vortex generator surface 3000 and the spacing of projections 3002.

The generation of vortices by the vortex generator surface 3000 aid in the reduction in the vorticity magnitude of the wake produced by both the interaction of the duct arrangement 100 with the fluid flow and also by the interaction of the rotor (not shown) housed therein. Additionally, flow separation on the outer surface of the first and second duct sections 1000, 2000 is reduced when compared with a ducted propulsion unit without a vortex generator surface 3000. This advantageously results in increased thrust production for equivalent energy input. Overall, this provides for a more efficient propulsion unit, control of the turbulent wake, and a reduction in downstream vorticity. Furthermore, improved bollard pull performance is obtained, cavitation development is restrained, and underwater radiated noise is reduced.

In the exemplary embodiment illustrated in FIGS. 2 and 3, the vortex generator surface 3000 comprises a series of laterally aligned projections 3002. The projections 3002 being laterally aligned means that they are aligned side-by-side. That is, the projections are adjacent one another. Here, the projections are aligned to form a continuous surface 3004 having a leading edge 3006. The alignment of the projections 3002 results in the foremost point of each projection being aligned in a plane. In this case, said plane is a plane which is perpendicular to the central longitudinal axis of the first and second duct sections 1000, 2000.

The leading edge 3006 has a continuous wave-like profile, created by the rise and fall of the plurality of projections 3002. The terms "wavelength" and "amplitude" used to describe the dimensions of the projections 3002 are particularly appropriate here. The wavelength is indicated at 3008, and the amplitude is indicated at 3010. The projections 3002 are curved along their length such that together the projections 3002 form a ring of laterally aligned projection 3002 as shown in the figure. It is worth noting that the projections extend around the circumference of the duct, and not along the duct (e.g. not along an inner or outer surface of the duct). This may improve performance, and/or simplify construction.

Figure 4:
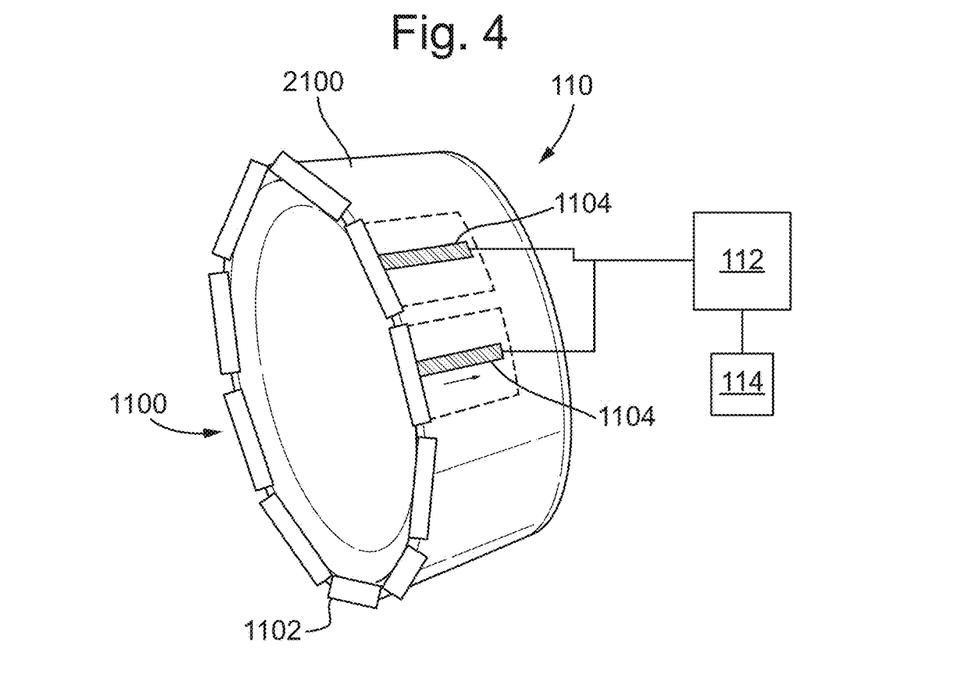
FIG. 4 shows a perspective view of an arrangement according to an exemplary embodiment in a first configuration.
Figure 5:
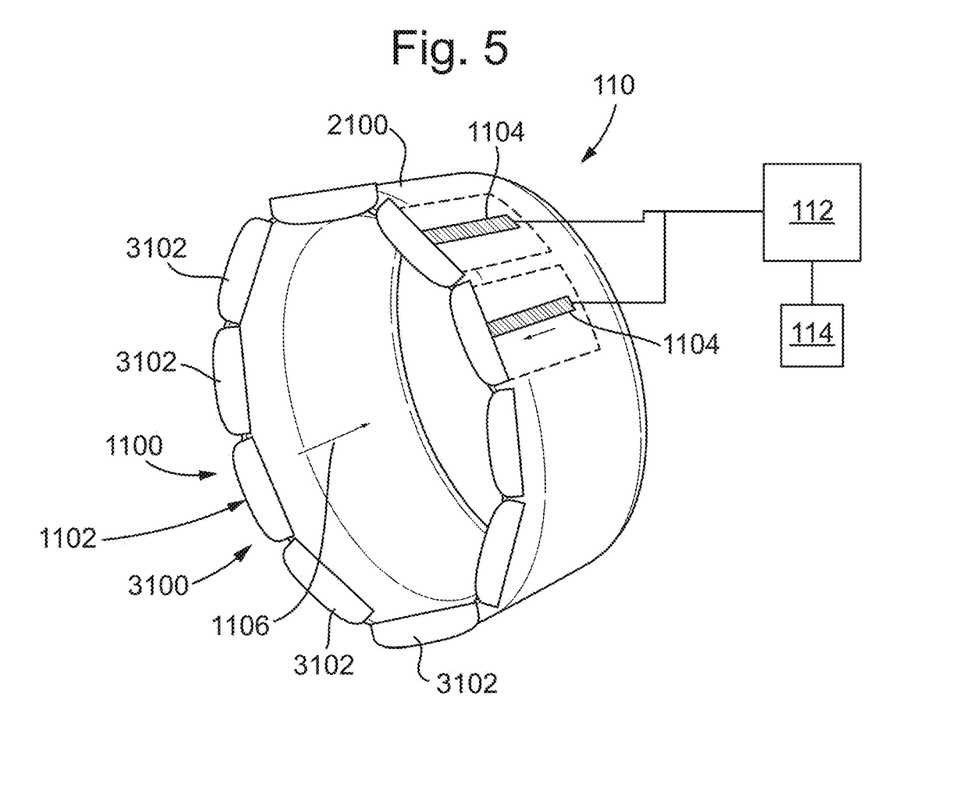
FIG. 5 shows the arrangement of FIG. 4 in a second configuration.

Referring to FIGS. 4 and 5, an arrangement 110 is shown. The arrangement 110 is for installation in an aircraft or watercraft. The arrangement 110 is for influencing fluid flow. In one exemplary embodiment, the arrangement 110 is similar in its overall construction to the duct arrangement 100 described above. That is, the arrangement 110 can comprise duct sections. However, the arrangement 110 also finds application in sections and flow control surfaces other than ducts.

In the arrangement 110, a first section 1100 is selectively configurable to provide a vortex generator surface 3100. The vortex generator 3100 is provided to induce vortices in the fluid flow. In one exemplary embodiment, the fluid flow is a liquid flow (e.g. as opposed to air flow).

The provided vortex generator surface 3100 comprises a plurality of projections 3102. The term "projections" is intended to include serrations and/or undulations. As described above, each projection has a length (which may be described as a "wavelength") and a height (which may be described as an "amplitude"). The projections 3002 project in a direction substantially opposite to a first direction 1106.

In this way, the arrangement 110 is configurable in a configuration wherein the vortex generator surface is not provided, and thereby does not interact with the fluid flow to induce vortices therein. The arrangement 110 is selectively configurable in a configuration wherein the vortex generator surface 3100 is provided, and thereby interacts with the fluid flow to induce vortices therein. The arrangement 110 is selectively configurable in a configuration wherein the vortex generator surface 3100 is provided, to a certain extent or degree (e.g. partially) and thereby interacts with the fluid flow to induce vortices therein to a certain extent or degree. Advantageously, this allows the arrangement 110 to be configured to provide the vortex generator surface 3100 when it is deemed desirable or necessary to induce vortices in the fluid flow using the vortex generator surface 3100. Advantageously, this also allows the vortex generator surface 3100 to be removed, or otherwise not provided to interact in the fluid flow, which can be beneficial to reduce drag or increase the craft wake where appropriate. These benefits have, in particular, not been contemplated or realisable in a liquid (e.g. water) environment). This is surprising, given the benefits that are possible from such an application.

As mentioned above, the provided vortex generator surface 3100 in the arrangement 110 interacts with the fluid flow to induce a second set of fluid properties, the second set of fluid properties comprising an increase in vorticity magnitude of the fluid flow. The vortex generator surface 3100 is configured to induce a plurality of periodic, spaced apart vortices, which correspond to the form of the vortex generator surface 3000 and the spacing of projections 3002.

The generation of vortices by the vortex generator surface 3100, when provided, aid in the reduction in the vorticity magnitude of the wake. Additionally, flow separation on the outer surface of the first and second sections 1100, 2100 is reduced when compared with a propulsion unit without an associated vortex generator surface 3100. This advantageously results in increased thrust production for equivalent energy input. Overall, this provides for a more efficient propulsion unit, control of the turbulent wake, and a reduction in downstream vorticity. Furthermore, improved bollard pull performance is obtained, cavitation development is restrained, and air/underwater radiated noise is reduced.

The arrangement 110 further comprises a second section 2100. The first section 1100 and second section 2100 are movable relative to one another to provide the vortex generator surface 3100.

The arrangement 110 further comprises a controller 112. The controller 112 is arranged to implement the selective configuration of the vortex generator surface 3100. That is, in this exemplary embodiment, the controller 112 controls actuators to extend or expand, or retract or contract when it is necessary or desirable to provide the vortex generator surface 3100. For example, the controller can implement the selective configuration of the vortex generator surface 3100 following:

a. A user command;

b. Input from an additional sensor arrangement 114, for example, a sensor arrangement operable to measure and detect turbulent flows, craft velocities and/or fluid flow velocities or the like; and/or c. Environmental conditions, for example, levels of turbulence, proximity to other craft, time of day, altitude or the like.

The first section 1100 comprises a resilient membrane 1102 and an actuator assembly 1104. The actuator assembly 1104 is operable to adjust the profile of the resilient membrane to provide the vortex generator surface 3100.

The resilient membrane 1102 is provided in sections across the leading edge of the second section 2100. The actuator assembly 1104 comprises a plurality of linear actuators, one actuator for each section of resilient membrane 1102. In the retracted position, the actuators extend back into the second section 2100.

Actuating the actuators causes them to extend away from the second section 2100 to contact and force the resilient membrane sections away from the second section 2100, thereby providing a vortex generator surface 3100 comprising a series of projections at the leading edge of the second section 2100.

Whilst the embodiment described above comprises an actuator assembly 1104 and a resilient membrane 1102, other constructions selectively configurable to provide a vortex generator surface are suitable. For example, in one exemplary embodiment, the first section comprises a shape memory alloy, and the application of heat, for example a heated fluid, causes the shape memory alloy to deform to provide a series of projections. In another exemplary embodiment, the first section may comprise rigid projection members, and a resilient biasing means, or indeed an actuator assembly similar to that described above, can cause the projection members to extend from the second section and/or retract into the second section.

The advantages of vortex generator surfaces are quantified with references to the following non-limited examples provided below. Whilst the examples provided relate to duct sections, the person skilled in the art will appreciate that similar advantages are obtainable by use of a vortex generator surface with other sections, and thus exemplifies the benefits of both arrangements 100, 110.

Figure 6:
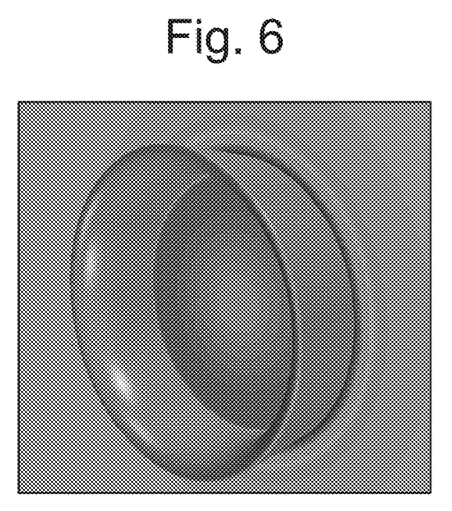
FIG. 6 shows interaction of the duct of FIG. 1 with a fluid flow.
Figure 8:
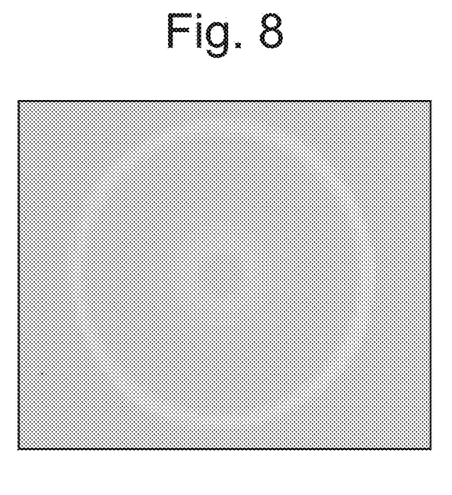
FIG. 8 shows interaction of the duct of FIG. 1 with a fluid flow.

FIGS. 6 and 8 show a first duct and propeller interacting with a fluid flow. The duct and propeller are shaped and sized so as to have a first set of geometrical parameters. The person skilled in the art will appreciate that the geometrical parameters suitable for a duct and propeller arrangement depends on the specific application and use of the arrangement. The concentric rings surrounding the outside of the duct in FIG. 6 indicate drag induced by the leading edge of the duct. In FIG. 8, a ring-shaped streamwise wake pattern can be seen, indicated by the continuous ring surrounding the duct.

Figure 7:
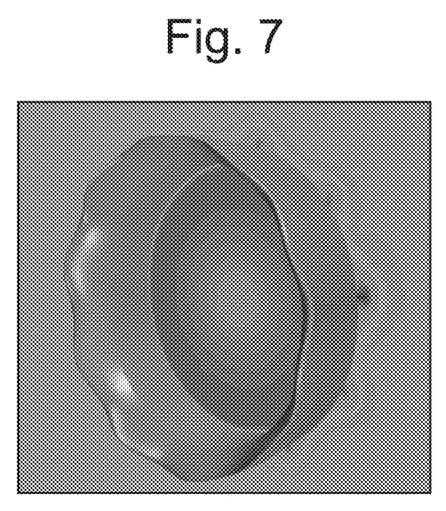
FIG. 7 shows interaction of the duct arrangement of FIG. 2 with a fluid flow.
Figure 9:
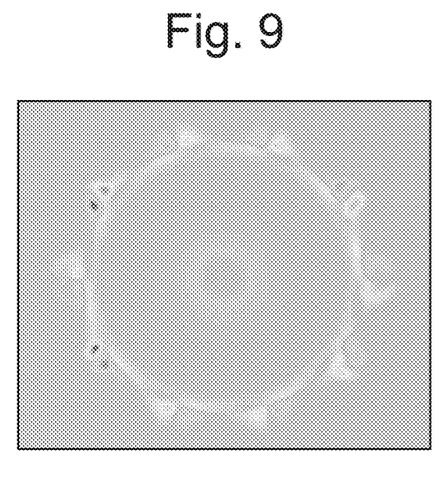
FIG. 9 shows interaction of the duct arrangement of FIG. 2 with a fluid flow.

FIGS. 7 and 9 show a second duct and propeller interacting with a fluid flow. The second duct and propeller have identical geometrical parameters to the first duct and propeller of FIGS. 6 and 8. In FIGS. 7 and 9, in addition to the duct and propeller, a vortex generator surface is provided at the leading edge of the duct.

As can be seen in FIG. 7, regions of drag are compartmentalised at periodic intervals about the circumference of the duct. This is due to the provision of the vortex generator surface. As a result, this creates less overall drag when compared with the duct and propeller of Example 1. In this example, there is a 50% reduction in total drag.

As can be seen in FIG. 9, counter rotating streamwise vortices are induced by the vortex generator surface, whereas they were not in Example 1 above. As can be seen in the figure, the vortices are spatially separated, i.e. spaced apart, about the circumference of the duct. That is, the vortex generator surface is configured to induce a plurality of spaced apart vortices. The vortices induced are periodic.

The induced vortices aid in the reduction in the magnitude of the wake. Comparing FIGS. 6 and 7, whilst the duct is shown to interact with the fluid flow, resulting in a first set of fluid properties (for example, a first wake pattern), the vortex generator surface interacts with the fluid flow to induce a second set of fluid properties (for example, a second wake pattern). As shown in FIG. 9, the second set of fluid properties may include an increase in the vorticity magnitude of the fluid flow, which surprisingly reduces the vorticity magnitude of the wake.

Additionally, flow separation on the outer surface of the duct in Example 2 is lower than that of Example 1, as a result of the provision of the vortex generator surface. This advantageously results in increased thrust production for equivalent energy input. Overall, this provides for a more efficient propulsion unit, control of the turbulent wake, and a reduction in downstream vorticity. Furthermore, improved bollard pull performance is obtained, cavitation development is restrained, and underwater radiated noise is reduced.

Figure 10:
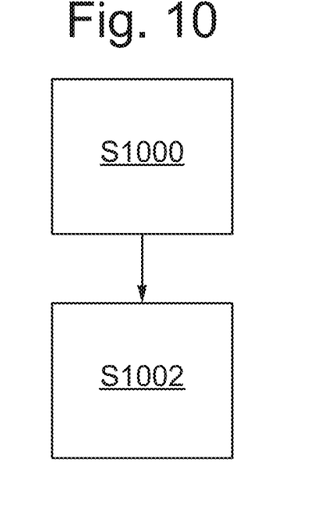
FIGS. 10, 11 and 12 show methods according to exemplary embodiments.

Referring to FIG. 10, a method of guiding fluid flow is shown. Step S1000 comprises generating vortices in a fluid flow using a second duct section comprising a vortex generating surface. Step S1002 comprises receiving the fluid flow in a first duct section.

Figure 11:
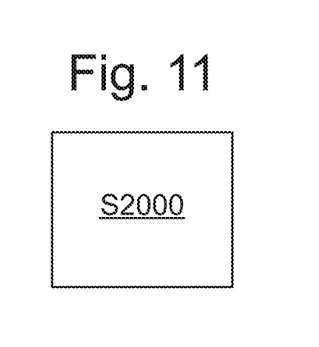

Referring to FIG. 11, a method of influencing liquid flow in an arrangement comprising a first section selectively configure to provide a vortex generator surface is shown. Step S2000 comprises configuring the first section to provide the vortex generator surface to induce vortices in the liquid flow.

Figure 12:
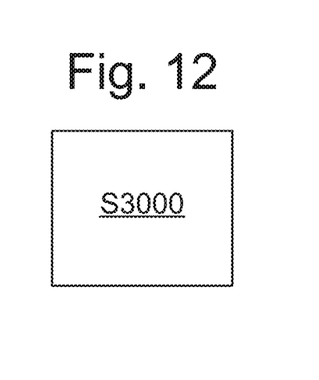

Referring to FIG. 12, a method of influencing fluid flow in an arrangement comprising a first section selectively configurable to provide a vortex generator surface comprising a series of laterally aligned projections is shown. Step S3000 comprises configuring the first section to provide the vortex generator surface to induce vortices in the fluid flow.

The apparatus described herein could be made or manufactured as a completely new, standalone entity in certain examples. However, at least some implementations could be readily retrofitted to realise the above advantages, for example retrofitting a vortex generator surface as discussed herein, to an existing flow influencing surface or object, or moving an existing vortex generator surface to a different location, and so on.

As above, it will be appreciated that the aspects and embodiments are closely linked and interrelated, and different features of any one aspect or embodiment could sometimes be used in addition with, on in place of, a feature of another aspect or embodiment.

Although a few preferred embodiments of the present invention have been shown and described, it will be appreciated by those skilled in the art that various changes and modifications might be made without departing from the scope of the invention, as defined in the appended claims.

The preceding description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the preceding description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. The terms "front", "rear", "side", "upper", "lower", "over", "under", "inner", "outer" and like terms are used to refer to the apparatus and its components in the orientation in which it is illustrated, which is the orientation in which it is intended to be used but should not be taken as otherwise limiting. Like reference numerals are used to denote like features throughout the figures, which are not to scale.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An arrangement for influencing a liquid flow, the arrangement comprising:
a first section selectively configurable to provide a vortex generator surface at a leading edge of the first section, the vortex generator surface comprising a series of laterally aligned projections, to induce vortices in the liquid flow;
a second section downstream of the vortex generator surface and the first section; and
an actuator assembly comprising at least one actuator for extending the vortex generator surface between an extended position away from the second section and a retracted position back toward the second section;
wherein, in the extended position, the vortex generator surface increases a vorticity magnitude of the liquid flow, and, in the retracted position, the vortex generator surface decreases the vorticity magnitude of the liquid flow.

2. The arrangement according to claim 1, wherein the second section comprises a flow control surface.

3. The arrangement according to claim 2, wherein the flow control surface includes a rudder, a duct, and/or a rotor.

4. The arrangement according to claim 1, further comprising a controller arranged to implement the selective configuration of the vortex generator surface.

5. The arrangement according to claim 4, wherein the controller is arranged to implement the selective configuration of the vortex generator surface in dependence upon: a user command, input from a sensor arrangement, and/or one or more environmental conditions.

6. The arrangement according to claim 1, wherein the vortex generator surface comprises a resilient membrane, wherein the actuator assembly is operable to adjust a profile of resilient membrane to extend the vortex generator surface away from the second section and to retract the vortex generator surface back into the second section.

7. The arrangement according to claim 1, wherein the first section is formed from a shape memory alloy.

8. A watercraft comprising the arrangement according to claim 1.

9. A method of influencing a liquid flow in an arrangement comprising a first section selectively configurable to provide a vortex generator surface comprising a series of laterally aligned projections at a leading edge of the first section, a second section downstream of the vortex generator surface and the first section, and an actuator assembly comprising at least one actuator for extending the vortex generator surface between an extended position away from the second section and a retracted position back toward the second section, the method comprising:
configuring the first section to provide the vortex generator surface to induce vortices in the liquid flow,
wherein, in the extended position, the vortex generator surface increases a vorticity magnitude of the liquid flow, and, in the retracted position, the vortex generator surface decreases the vorticity magnitude of the liquid flow.

* * * * *